United States Patent [19]

Fliege

[11] Patent Number: 5,678,646
[45] Date of Patent: Oct. 21, 1997

[54] PROPULSION SYSTEM AND KIT FOR HYBRID MOTOR VEHICLE

[75] Inventor: Hans Fliege, Obertheres, Germany

[73] Assignee: Fichtel & Sachs AG, Schweinfurt, Germany

[21] Appl. No.: 566,150

[22] Filed: Dec. 1, 1995

[30] Foreign Application Priority Data

Dec. 2, 1994 [DE] Germany ............ 44 42 867.7

[51] Int. Cl.$^6$ ............... B60K 1/00; H02K 9/00
[52] U.S. Cl. ................... 180/65.1; 310/112
[58] Field of Search ............... 180/65.2, 65.3, 180/65.4, 65.5, 65.6, 65.1; 310/42, 68 R, 112

[56] References Cited

U.S. PATENT DOCUMENTS

| | | | |
|---|---|---|---|
| 3,570,620 | 3/1971 | Fisher et al. | 180/26 |
| 4,233,532 | 11/1980 | Esters | 310/46 |
| 4,284,913 | 8/1981 | Barnhardt | 310/54 |
| 4,500,772 | 2/1985 | Ahner et al. | |
| 5,172,784 | 12/1992 | Varela, Jr. | 180/65.4 |
| 5,510,658 | 4/1996 | Nakayama | 307/10.1 |

FOREIGN PATENT DOCUMENTS

| | | |
|---|---|---|
| 0159005 | 10/1985 | European Pat. Off. . |
| 0231785 | 8/1987 | European Pat. Off. . |
| 0340686 | 11/1989 | European Pat. Off. . |
| 0351272 | 1/1990 | European Pat. Off. . |
| 3842588 | 6/1990 | Germany . |
| 4133059 | 4/1993 | Germany . |
| 4244721 | 4/1994 | Germany . |
| 4417432 | 12/1994 | Germany . |
| 2289581 | 11/1995 | United Kingdom . |

OTHER PUBLICATIONS

"What kind of gas should we buy tomorrow", BMW Magazine, Mar. 1994, pp. 70–74.
"Das elektrische Getriebe von Magnet–Motor für PKW und Omnibusse", VDI Berichte Nr. 878, 1991, pp. 611–622.
BMW Magazine, Mar. 1994, p. 73.

*Primary Examiner*—Brian L. Johnson
*Assistant Examiner*—Avraham Lerner
*Attorney, Agent, or Firm*—Nils H. Ljungman and Associates

[57] ABSTRACT

A propulsion system for a vehicle comprising an electric motor, circuit breakers which switch field windings of the electric motor, as well as a cooling device which cools the field windings and the circuit breakers by its coolant circuit. The electric motor is realized in the form of a first modular unit which is mechanically functional in itself. The circuit breakers are assembled in at least one second modular unit, which is connected firmly to the first modular unit to form a propulsion unit. The individual modular units can be separated from one another and are connected to one another both by detachable electrical interface connections and also by detachable coolant interface connections. This construction makes it possible to selectively expand the propulsion unit by adding additional modular units, or in the event of the failure or malfunction of individual modular units to replace the modular units without having to replace the entire propulsion unit.

19 Claims, 3 Drawing Sheets

PROPULSION SYSTEM AND KIT FOR HYBRID MOTOR VEHICLE

BACKGROUND OF THE INVENTION

1. Field of the Invention

The present invention generally relates to a propulsion system for a hybrid motor vehicle, in particular a hybrid road vehicle, and a kit for providing a propulsion system for such a hybrid motor vehicle.

The present invention also generally relates to a propulsion system for a motor vehicle, in particular a road vehicle, with an electric motor which can be actuated by means of an electronic circuit breaker element.

2. Background Information

To propel vehicles, for example motor vehicles, it is known to use at least one electric motor to propel the vehicle, which motor is for its part fed by a generator which is in turn powered by an internal combustion engine. Such concepts are described, for example, in "Das elektrische Getriebe von Magnet-Motor for PKW und Omnibusse" [The Electrically Controlled Gearbox of Magnetic Motors for Cars and Buses] by P. Erhard, VDE-Berichte No. 878, 1991, Pages 611 to 622, as well as in German Patent No. 41 33 059 A1. The applications described in these publications include both serial hybrid propulsion systems in which the clutch, gearbox and universal joint are eliminated, and the internal combustion engine which powers the generator is always operated in a range which is optimal with regard to the discharge of pollutants in the exhaust, fuel consumption and other such factors, as well as parallel hybrid propulsion systems in which the conventional power train is retained, and the electric motor can be actuated temporarily and intermittently. Motors which are suitable for use in such applications are disclosed in EP 0 159 005 A2, for example. Control circuitry for such motors is described in European Patent No. 0 340 686 A1.

In the applications of a hybrid propulsion system as described above, compromises must usually be made in order to accommodate a number of different requirements. A standard problem in vehicles, and in motor vehicles in particular, is that only a small amount of space is usually available. The electric motors which have come into use generally have power capacities which range from a few kW up to several 100 kW, whereby the operating voltage is in the order of magnitude from a few 10 V up to approximately 1000 V, with corresponding currents. Thus, there tends to be a requirement for very compact electric motors with high power densities. When the electric motor is switched and/or commutated by means of electrical valves, the electrical valves must generally be located in close proximity to the motor, to keep incoming inductances low and to make it possible to achieve high switching rates. Furthermore, the operation of the electrical valves, in particular when they are realized in the form of power semiconductor elements, must generally be kept in a relatively low temperature range, so that it is possible to effectively discharge the thermal losses generated. On account of the compact design and the high power density of the electric motor, special attention must also usually be paid to the cooling of the field windings.

German Patent No. 42 44 721 A1 discloses an electrical machine which has a stator carrying the field windings, in which the power semiconductors which form the electrical valves are combined with the field windings into one assembly, and are cooled with the field windings by a common cooling circuit. The power semiconductor elements are located in a recess of the stator which is in heat-exchange contact with the coolant which flows past the field windings in a cooling duct which runs through the stator. The stator is closed externally by an axial end plate which protects the power semiconductor elements from mechanical damage and is provided with connections for the coolant circuit.

Page 73 of a brochure entitled "BMW-Magazin", March 1994, published by Bayerische Motoren Werke AG, describes an electrical propulsion system which combines an electric motor and its electronic control system in one housing. The housing consists of two half-housings which can be connected to one another, whereby the components of the electric motor are located primarily in one half of the housing, while the components in the other half of the housing are primarily those of the control system, in particular the electrical valves.

Both of the last two solutions described above have the problem that different types of vehicles, in particular vehicles which have different engine capacities, each require their own complete unit, consisting of an electric motor, electrical valves and possibly also parts of the control system for the electrical valves, all of which must apparently be developed, manufactured and kept in inventory. Since the units are sold by the manufacturer as package arrangements, if a vehicle is being converted, (for example, if it is being equipped with a higher-power propulsion system), the entire unit must essentially be replaced. The old unit essentially cannot be modified and expanded. The result tends to be relatively high costs for the manufacturer, who essentially must supply individual units for all sorts of different applications.

OBJECT OF THE INVENTION

An object of the present invention is to create an electrical propulsion system for a vehicle which makes it possible for the manufacturer of such a propulsion system to orient the range of his products more economically to different vehicle models and applications.

SUMMARY OF THE INVENTION

The present invention teaches that the object can be accomplished, in accordance with at least one preferred embodiment, by means of a propulsion system for a vehicle, in particular a road vehicle, comprising:

- an electric motor,
- an electronic circuit breaker element connected to the field windings of the electric motor, whereby the electronic circuit breakers are mounted on the electric motor,
- a control circuit which controls the circuit breakers, and
- a cooling device, the cooling circuit of which cools the electric motor and the circuit breakers mounted on it.

The invention teaches that the object can be accomplished, in accordance with at least one preferred embodiment, by an electric motor which forms a first modular unit which is mechanically functional in itself, with at least the circuit breakers being combined into at least one second modular unit separable from the first modular unit, the at least one second modular unit firmly connected to the first modular unit to form a propulsion unit. Further, the cooling circuit of the cooling device runs through the first modular unit and each second modular unit, and the modular units are connected to one another by means of detachable coolant interface connections and detachable electrical interface connections.

As a result of the modular construction of the propulsion unit, it becomes possible to use at least some identical modular components in the manufacture of propulsion units which have different characteristics. Consequently, it becomes significantly easier to meet each customer's specific requirements. From the point of view of the cost of development and manufacturing, it is particularly advantageous that the teaching of the invention makes it possible to manufacture individual modular units which are used frequently in large numbers. For example, given a suitable distribution of the electrical and mechanical components between the individual modular units, standard modules can be formed which are the common basic component of a number of different propulsion units.

Since the invention also teaches that the circuit breakers can be located in close proximity to the electric motor, and large incoming inductances and complex and bulky cooling lines can thereby be eliminated, the amount of space required is essentially as small as with the fully-integrated known solutions. However, within a given set of installation conditions, the designer is now able to react very flexibly with different designs for the task to be performed, e.g. by replacing one of the second modular units.

The present invention, in accordance with at least one preferred embodiment, can be provided in particular for use in the context of the hybrid propulsion concepts described above, but that does not rule out the use of the present invention in vehicles which are operated exclusively with batteries.

The propulsion unit can comprise at least one third modular unit which is detachably but firmly connected to the propulsion unit, and which is connected by means of detachable electrical interface connections to the first modular unit and/or at least one of the second modular units and/or at least one additional third modular unit. The coolant circuit is preferably also routed through at least one of the third modular units, and this at least one third modular unit is connected by means of detachable coolant interface connections to the first modular unit and/or at least one of the second modular units and/or at least one additional third modular unit. The third modular units may also contain only components which are essentially not critical in terms of the temperature at which they can operate. For this case, the present invention teaches that the coolant circuit in the third modular unit can be routed through channels which essentially only create a continuous passage between coolant interface connections.

By means of the electrical interface connections, through connections can be created between the first, the second and the third modular units for control signals, sensor signals, the intermediate circuit voltage of a direct current intermediate circuit (if any), as well as winding connections for the electric motor. The same is true for the coolant circuit. One or more of the modular units can have connection points for the external components of the control circuitry, the direct current intermediate circuit and the coolant circuit. In this case, it should be noted that the electric motor is not limited to a direct current motor, but can also be an alternating current motor or a three-phase current motor.

The modularity of the propulsion system contemplated by the present invention makes it a very simple and practical procedure to integrate parts of the control circuit into the propulsion unit. The present invention teaches that at least some of the electronic components of the control circuitry are preferably located in at least one of the two modular units and/or in at least one of the third modular units. All or come of the control circuitry can be contained in a special modular unit which is realized in the form of a control module. It goes without saying that it may also be appropriate to distribute the components among several modular units. The modular units, in particular the second modular units, may contain parts of a driver element which drives the circuit breakers, and may also contain parts of the control circuitry.

The propulsion system contemplated by the invention is also suitable for use in tandem propulsion systems, in which two electric motors, combined into one structure, are mounted on one vehicle axis, and each of the motors drives one wheel of the vehicle. With regard to such a tandem propulsion system, the present invention teaches that the propulsion unit comprises an additional electric motor which forms an additional first modular unit being detachably but firmly connected to the propulsion unit, whereby the first modular unit is mechanically functional in itself, and that the coolant circuit also runs through the additional first modular unit, and the first modular unit is connected by means of detachable electrical interface connections and detachable coolant interface connections to the other of the two first modular units and/or at least one of the second and/or at least one of the third modular units. The circuit breakers which switch the field windings of this second electric motor can be contained, with the circuit breakers of the first electric motor, in a common second modular unit, or can be divided among several modular units, each of which corresponds respectively to one of the two electric motors. The additional circuit breakers are controlled by the control circuitry. The control can thereby be exercised by means of separate control signals, so that, as a function of the currents to be switched, different driving torques can be generated in the wheels which are connected to the electric motors. However, problems can occur if an electric motor or the corresponding components of the electronic circuit breaker element fail. In that case, it is favorable if the control circuit has safety backups which make it possible to compensate in a controlled manner for the failed propulsion motor. To be able to react appropriately to such a situation, the invention also teaches that each of the two first modular units can correspond to at least one second modular unit, and that the electronic circuit breakers of these second modular units can be controlled, if necessary, by means of a common control bus which is routed via at least one of the third modular units, via its electrical interface connections, and is connected to the control circuitry.

In one preferred embodiment of the present invention, at least some of the modular units in the propulsion system are connected to one another to form a stack. The result is a compact propulsion unit which is easy to handle, assemble and install, and which can also be expanded at essentially any time to include additional modular units, on account of the electrical interface connections and the coolant interface connections of the individual modular units. In view of the space available for installation in vehicles, which is generally very restricted in the vertical direction, a preferred solution will be one in which the modular units are essentially adjacent, in the axial direction of the electric motor, on one side to one axial end wall of the electric motor.

A great deal of flexibility in the selective expansion capability of a propulsion unit by the installation of additional modular units and in the selection of the sequence in which the modular units are arranged is provided by the fact that at least two pairs of modular units connected to one another have an identical interface pattern, at least with regard to the electrical interface connections and the coolant interface connections. If the mechanical interfaces of the modular units are also identical, the essential prerequisites are created for a modular system, in which a relatively small number of different types of modular units can be used to construct propulsion units which have all sorts of different characteristics. In particular, in the context of such a modular principle, it can be advantageous if, when the propulsion unit is realized by means of several second modular units, at least some of the latter contain an identical number of electronic circuit breakers.

The costs of manufacturing and inventory maintenance can be reduced even further if the propulsion unit comprises at least one group of modular units which are at least mechanically and structurally similar. The second modular units, for example, can also be essentially identical in terms of their electrical construction. This measure makes it possible to realize the cost advantages of large manufacturing runs.

In one particularly preferred embodiment of the invention, the second and the third modular units, if any, are realized at least in part as essentially flat, disc-shaped or pancake-shaped modules which are in contact with one another by means of their flat sides, and the electrical interface connections and/or the coolant interface connections are made between adjacent disc-shaped modules by means of their flat sides which are in contact with one another. The disc-shaped modules can be essentially identical to one another in terms of their basic mechanical structure, and can be adapted to their function as a second or third modular unit by equipping them with different electrical or electronic components. The basic form of the disc-shaped modules is preferably approximately circular, so that they can be kept very flat and can be connected in a series to one axial end wall of the electric motor, i.e. so that they do not take up an excessive amount of space.

The coolant circuit is preferably routed in channels through the disc-shaped modules which emerge at the flat sides of a housing surface of the disc-shaped modules, and in particular run essentially orthogonally to the plane of the disc. In this manner, the distance travelled by the coolant in the coolant circuit between the actual components to be cooled, such as the circuit breakers and the field windings, can be kept very short. This measure also permits a simple realization of the coolant interface connections, if, for example, sealing means, e.g. a gasket, can be located between two adjacent disc-shaped modules around the openings, and the openings can be brought into alignment with one another.

A measure which increases the compactness of the propulsion unit is that the disc-shaped modules are arranged in the axial direction of the electric motor inside the circumferential contour of the electric motor, in particular in axial alignment with the motor.

Semiconductor elements are preferably used as the circuit breakers. IGBT (Insulated Gate Bipolar Transistors) have been found to be particularly advantageous, although the use of BIMOS (Bipolar Metal Oxide Semiconductor) power transistors or MOSFET (Metal Oxide Semiconductor Field Effect Transistor) power transistors can be considered for certain frequency and power ranges. For the cooling of such semiconductor elements, German Patent No. 42 17 289 A1 discloses systems in which the semiconductor elements are located in an insulated mounting board, and are either cooled directly by the coolant or are in a heat-exchange contact with the coolant by means of the insulated mounting board. In connection with the disc-shaped realization of the modular units which contain the circuit breakers, it has been determined that a solution which is particularly advantageous with regard to the cooling action is one in which, for a disc-shaped module which forms a second modular unit, at least one mother board for the circuit breakers and electronic components, if any, of parts of the control circuit and/or of a driver circuit which drives the circuit breakers, is mounted essentially orthogonally to the plane of the disc, and the mother board forms one wall of the coolant channel which is part of the cooling circuit. The mother board can comprise an electrically insulated board, in particular one made of ceramic material or painted steel, on the flat side of which a layer of metal, preferably a layer of copper, is applied to the flat side which faces the coolant channel, and the circuit breakers and other electronic components, if any, are located on its other flat side. The layer of metal produces a uniform heat distribution on the flat side of the insulator board which faces away from the circuit breakers, and thereby counteracts local overheating which could destroy the circuit breakers. The circuit breakers themselves can be realized in the form of unenclosed chips, and can have a metal electrode which forms the collector or drain of a power transistor, which metal electrode is applied directly to the insulator board as a surface coating of metal.

For the space-saving installation of the electrical, electronic and mechanical components in the disc-shaped modules as well as a favorable routing of the coolant circuit in the disc-shaped modules, in one solution which has been determined to be advantageous, the disc-shaped modules have an approximately pot-shaped housing, with a housing bottom and a housing shell which encloses the housing bottom, whereby the housing bottom forms one wall of the coolant channels which is part of the coolant circuit.

Since the major part of the thermal losses of the propulsion system are generated by the circuit breakers, the circuit breakers should be located upstream of the electric motor in the direction of circulation of the coolant circuit, and should be in heat-exchange contact with the coolant, thereby guaranteeing the priority cooling of the circuit breakers.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in a kit for providing a propulsion system for a hybrid road vehicle, the kit for permitting adaptation of the propulsion system to a plurality of hybrid road vehicles, each such vehicle having: a chassis, the chassis defining a longitudinal direction and an axial direction perpendicular to the longitudinal direction; a plurality of drive wheels being rotatably mounted with respect to the chassis; a drive shaft for driving at least one of the drive wheels; the kit comprising: a first modular unit and a second modular unit; the first modular unit comprising means for being connected to a drive shaft to rotationally drive the drive shaft and at least one drive wheel; the second modular unit comprising a circuit breaker arrangement for being in electrical communication with the means for being connected to a drive shaft; means for connecting the first and second modular units to one another to form a propulsion unit for driving at least one drive wheel; the connecting means comprising means for permitting separation of the first and second modular units from one another; an additional modular unit, the additional modular unit comprising means for forming at least a portion of a different propulsion unit in combination with at least one of the first and second modular units; and means for operatively connecting the first modular unit and the additional modular unit with one another, to form at least a portion of a different propulsion unit, the different propulsion unit having characteristics different from a propulsion unit formed solely by the first and second modular unit.

Another aspect of the invention resides broadly in a propulsion system for a hybrid vehicle, in particular a hybrid road vehicle, the propulsion system comprising: an electric motor, an electronic circuit breaker element connected to field windings of the electric motor, whereby the electronic circuit breakers are mounted on the electric motor, a control circuit which controls the circuit breakers, and a cooling device, the cooling circuit of which cools the electric motor and the circuit breakers mounted on it, wherein: the electric motor forms a first modular unit which is mechanically functional in itself, and at least the circuit breakers are combined in at least one second modular unit which can be separated from the first modular unit but is connected firmly with the first modular unit into a propulsion unit; and the coolant circuit of the cooling device runs through the first and each of the second modular units, and the modular units are connected to one another by means of detachable coolant interface connections and detachable electrical interface connections.

BRIEF DESCRIPTION OF THE DRAWINGS

A preferred embodiment of the invention is explained in greater detail below, with reference to the accompanying drawings.

DESCRIPTION OF THE PREFERRED EMBODIMENTS

Figure 1:
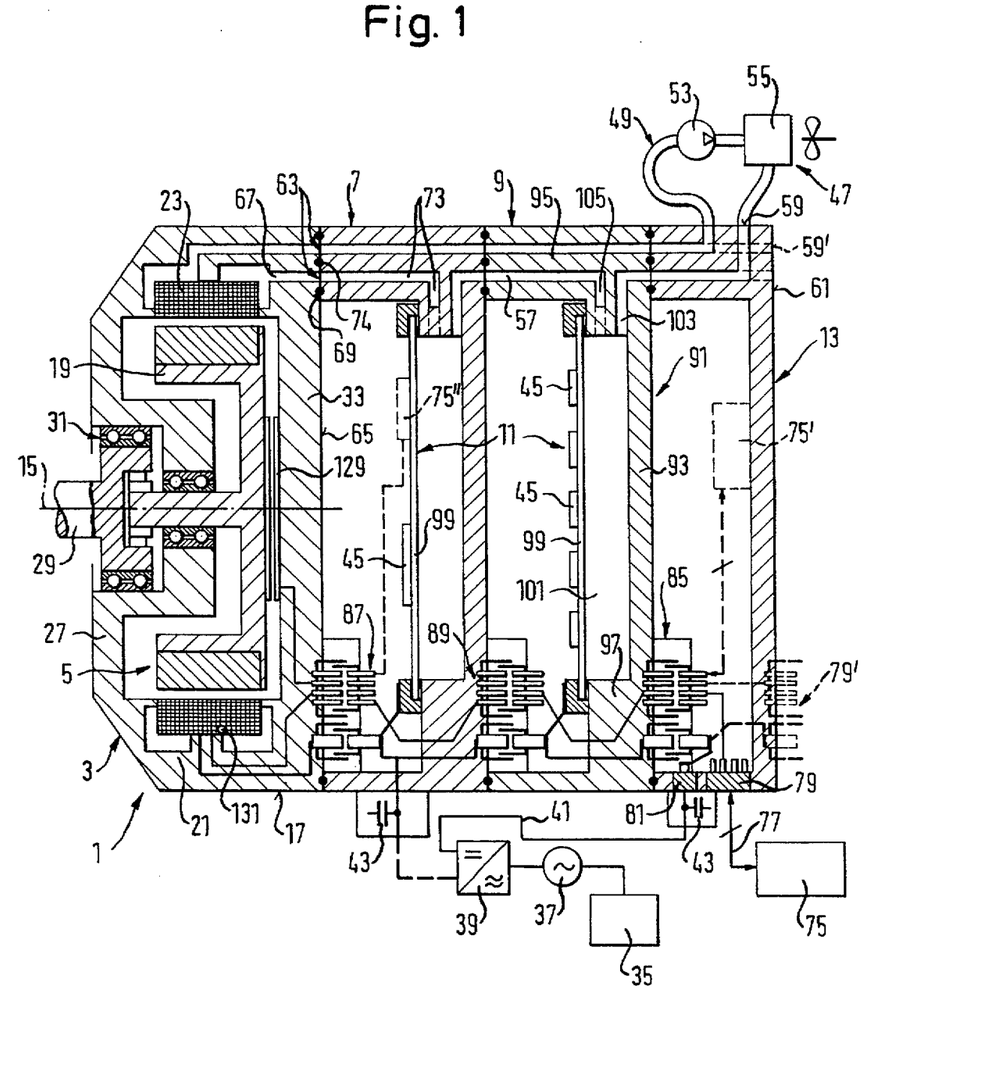
FIG. 1 is a sectional view of a propulsion system as contemplated by the present invention, with the circuit breakers being distributed between two second modular units.

The embodiment of the propulsion system illustrated in FIG. 1 comprises a propulsion unit 1 which has a modular construction. The propulsion unit 1 is preferably constructed of several modular units which are firmly connected to one another, but which can also be separated from one another, in which: a first modular unit 3 is formed by an electric motor 5; two second modular units 7 and 9, connected to the first modular unit 3, contain an electronic circuit breaker element 11, and a third modular unit 13 closes the propulsion unit 1 on the side farther from the motor. The third modular unit 13 is essentially realized in the form of a contact module which supplies the external connections for the propulsion unit 1. The two second modular units 7, 9 and the third modular assembly 13 are realized in the form of flat discs which have an essentially circular cross section, and are aligned in the axial direction of the axis of rotation 15 of the electric motor 5 with the circumferential contour 17 of the motor 5, which contour is also circular. An extremely compact and very small propulsion unit 1 can thereby be created which is particularly well-suited for installation in the vicinity of the wheel housings of a vehicle, in particular a motor vehicle. Other cross-section shapes of the disc-shaped modules 7, 9 and 13, and of the electric motor 5, are of course also possible.

The electric motor 5 can be a direct current commutator motor, an alternating current motor or a three-phase current motor. In the illustrated example, the electric motor 5 is realized in the form of an internal rotor motor with a permanent magnet rotor 19 and a stator 21 which surrounds the rotor 19. The stator 21 supports a number of field winding strands 23, which are switched and/or commutated by means of the electronic circuit breaker element 11. The stator 21 is held stationary on a mounting part 27 of the electric motor 5, and the rotor 19, as well as an output shaft 29, which output shaft 29 is non-rotationally connected to the rotor 19, are rotationally mounted on the mounting part 27 by means of a bearing system 31. The mounting part 27 encloses the electric motor 5 on the side farther from the rotor by means of an axial end wall 33, so that the first modular unit 3 which comprises the electric motor 5 forms a modular unit which is mechanically fully functional in itself. To achieve this function, the electric motor 5 essentially does not require any special additional supplementary components, but it can be combined in the form of a self-contained modular unit with different second modular units 7, 9, e.g. to form propulsion units which are capable of producing different power levels.

The propulsion system contemplated by the present invention is particularly well-suited for use in hybrid propulsion systems. Such a hybrid propulsion system is illustrated schematically in FIG. 1, and can comprise: a conventional internal combustion engine 35; a generator 37 which is powered by the internal combustion engine 35 and, as shown in the illustration, can be in the form of an alternating current source, e.g. a model with a number of stator-side phase windings and rotor side permanent magnets; and the electric motor 5, which for its part can be fed by the generator 37.

The electrical feed is preferably supplied via an inverter system 39 which converts the alternating current supplied by the generator 37 into a direct current of manageable magnitude. By means of a direct current intermediate circuit 41 with the backup capacitors 43 which smooth the direct current, the inverter system 39 can feed the electronic circuit breaker element 11, which ultimately switches the stator-side field windings 23.

However, the present invention is not limited to the hybrid propulsion concept described above. It can also be used in connection with a feed for the electric motor via storage batteries, solar cells or even hydrogen-powered drive units. The illustrated propulsion unit can also be designed so that it can provide sufficient power to drive several wheels by means of a differential.

The electronic circuit breaker element 11 preferably comprises a multiplicity of semiconductor circuit breakers 45 connected to the field windings 23, which are preferably realized in the form of IGBT modules. Preferably, an equal number of circuit breakers 45 are located in each of the two modular units 7, 9. In particular when MOSFET switches are used, and also to some extent when IGBT switches are used, it is possible to create a base module which has a basic switching capability, and to provide different expansion modules which contain different numbers of circuit breakers, i.e. with the ability to switch different currents. The disc-shaped modules 7, 9 can be kept very small if the circuit breakers 45 are designed in an integrated manner as unenclosed chips. Such a design is also favorable with regard to the manufacturing costs, since the units can be manufactured relatively economically in large production runs.

During operation, it is generally desirable to cool both the circuit breakers 45 and the field windings 23. For this purpose, there is preferably a cooling device 47, the closed cooling circuit 49 of which runs through at least that portion of the propulsion unit 1 which comprises the first modular unit 3 and the second modular units 7, 9. The coolant can be force-fed by a pump 53 through a cooler or heat exchanger 55 to a coolant channel 57, which channel 57 transports the coolant in the direction of flow, first past the circuit breakers 45 and then past the field windings 23. In this manner, consideration is given to the primary importance of cooling the circuit breakers 45. The coolant channel 57 in the embodiment illustrated in FIG. 1 is also shown as being routed through the contact module 13, which has coolant connection points 59 to connect the cooling lines on its circumferential surface. Such coolant connection points 59 can also be located on the flat side 61 of the contact module 13 which is farther from the motor 5. In the event that there are additional components which are not equipped with circuit breakers, and that there are no other modular units which contain components which must be cooled, the coolant passage 57 can also be routed through these modular units, so that such a modular unit can be located between the second modular units or between the first and a second modular unit.

The routing of the coolant channel 57 through the modular units is preferably designed so that the individual modular units are connected to one another by means of detachable coolant interface connections 63. The coolant interface connections 63 can be of any appropriate type. In the illustrated embodiment, the fluid-tight connection of two successive modular units is essentially guaranteed by the fact that, if modular units 3 and 7, for example, are considered, the modular unit 3 preferably has a coolant channel segment 67 which runs essentially axially and emerges essentially orthogonally at the flat side 65 of the end wall 33, while the modular unit 7 preferably has a coolant channel segment 73 which runs essentially axially and emerges essentially orthogonally at the flat side 69 of the modular unit facing the electric motor 5. When the two modular units 3, 7 are connected together, their flat sides 65, 69 are preferably placed in contact with one another, with a mutual orientation of the openings of the channel segments 67, 73. Sealing means, e.g. O-rings 74, inserted between the modular units 3, 7 can preferably guarantee a tight connection between the two modular units. The other coolant interface connections between each two adjacent modular units are preferably realized in the same manner.

To control the electronic circuit breakers 45 or a driver element which drives the circuit breakers 45, there is preferably a control circuit 75 located outside the propulsion unit 1 and can be connected to the contact module 13 by means of a control bus 77. For this purpose, the contact module 13 has a connection bushing 79 on its circumferential surface. Of course, a connection by means of the flat side 61 of the contact module 13 is also conceivable, as indicated by the broken lines at 79'. The connection of the propulsion unit 1 to the direct current intermediate circuit 41 is preferably made via a similar female connector 81, whereby on account of the large capacitance of the backup capacitors 43, it may not be possible to integrate these capacitors 43 into the modular units. The capacitors 43 can then be located radially outside and mounted on the propulsion unit 1, e.g. by means of cartridges which can be screwed into the propulsion unit. This external mounting of the backup capacitors 43 is illustrated in FIG. 1. All or some of the control circuit 75 can also be installed in the propulsion unit 1, whereby special consideration should preferably be given to installing all of the control circuitry 75 inside the contact module 13, thereby forming an independent control module, or installing parts of the control circuitry 75 together with the circuit breakers 45 in the second modular units 7, 9. The latter case is illustrated in broken lines at 75'and 75". If parts of the control circuitry 75 can be installed inside the propulsion unit 1, the result, under some circumstances, is a significantly simplified external control interface of the propulsion unit 1. Problems with the electrical isolation between the control part and the power part can thus be minimized.

The winding connections of the field windings 23, the intermediate circuit voltage, control lines and sensor lines are preferably made at least by means of the first and the second modular components 3, 7, 9, in particular through all the modular units. For this purpose, the individual modular units are preferably connected to one another by means of detachable electrical interface connections 85 (shown by way of example only at the interface between the modular units 9 and 13). These electrical interface connections 85, as illustrated in the drawing, can be in the form of a plug-and-socket combination. Of course, any other appropriate type of connection can also be used. The electrical contact between the adjacent modular units can be made, for example, so that the connection is created only when the individual modular units are bolted to one another.

Provisions are preferably made so that at least some of the modular units have an identical interface structure with regard to the electrical interface connections 85 and the coolant interface connections 63, for example, so that each of the second modular units 7, 9 has a female connector 87 located on its flat side facing the electric motor 5, and a system of male connectors 89 on its flat side facing away from the electric motor 5. In this manner, individual modular units can be replaced as necessary, or additional modular units can be inserted into the propulsion unit 1. For example, the propulsion unit illustrated in FIG. 1 can be expanded by the interposition of a third disc-shaped module of the same type as the second modular units to create a more powerful propulsion unit. The detachable mechanical connection of the modular units to one another can be made by means of screws, plug-in connections, clips, latches etc.

The illustrated embodiment of a propulsion system, as contemplated by at least one preferred embodiment of the present invention, shows a construction of the disc-shaped module which can be manufactured very easily in large production runs of the disc-shaped modules 7, 9 and 13. The basis of this construction is an approximately pot-shaped housing 91 (FIG. 1 shows only the disc-shaped module 9 with the corresponding identification numbers) with a housing bottom 93 and a housing shell 95. The coolant channel 57 runs through the housing shell 95. The electrical interface connections 85 are also located in the vicinity of the housing shell 93. Near the housing bottom 93 there is an extension 97 projecting radially inward from the housing shell 95, on which is held a mounting board 99 which is essentially parallel to the housing bottom 93. The mounting board 99, together with the housing bottom 93 and the extension 97 which projects on all sides from the housing shell 97, defines the boundaries of a cooling chamber 101 which forms the coolant passage 57.

The coolant preferably flows through this cooling chamber 101 and thereby comes into a heat exchange contact with the circuit breakers 45 located on the side of the mounting board 99 farther from the cooling chamber 101. The cooling chamber 101 can be connected to the cooling circuit 49 by means of an inlet channel 103 which runs radially and an outlet channel 105 which also runs radially. The illustrated system is extremely favorable in terms of the discharge of the thermal losses, which tend to be locally high in the second modular units. The electrical lines are preferably also routed through the disc-shaped modules in the housing shell 95.

Figure 1A:
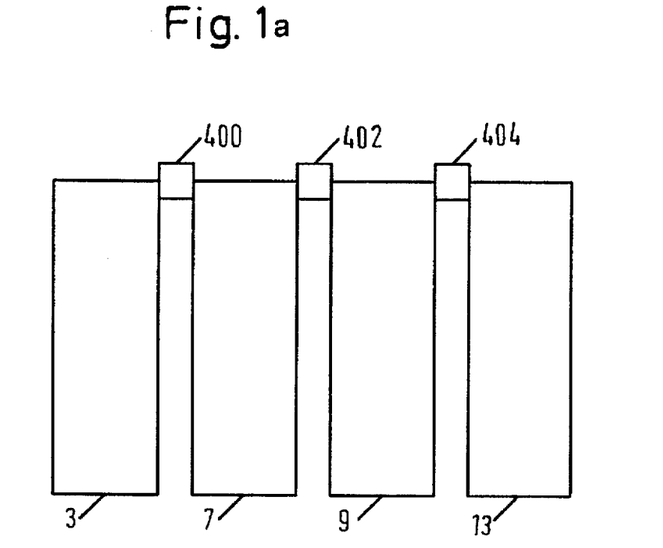
FIG. 1a is a schematic illustration of modular units and arrangements for their interconnection.

FIG. 1a schematically illustrates a plurality of modular units 3, 7, 9 and 13, as well as arrangements 400, 402 and 404 for their interconnection. Preferably, any suitable connection arrangement may be used to connect two adjacent modular units with one another. For example, it is conceivable, within the scope of the present invention, to include screws and/or bolts as interconnection arrangements 400, 402 and 404. Appropriate mounting flanges for such screws, bolts or related media may also be provided. Generally, in accordance with at least one preferred embodiment of the present invention, it is preferred to provide an arrangement which allows for fixed connection between two adjacent modular units, such that the connection is rigidly maintained during operation of the motor or during any other operation that may otherwise promote separation of the modular units, but which also allows for the relatively easy disconnection of such adjacent modular units when it is desired to disconnect the modular units, for example, for replacement or repair.

Figure 2:
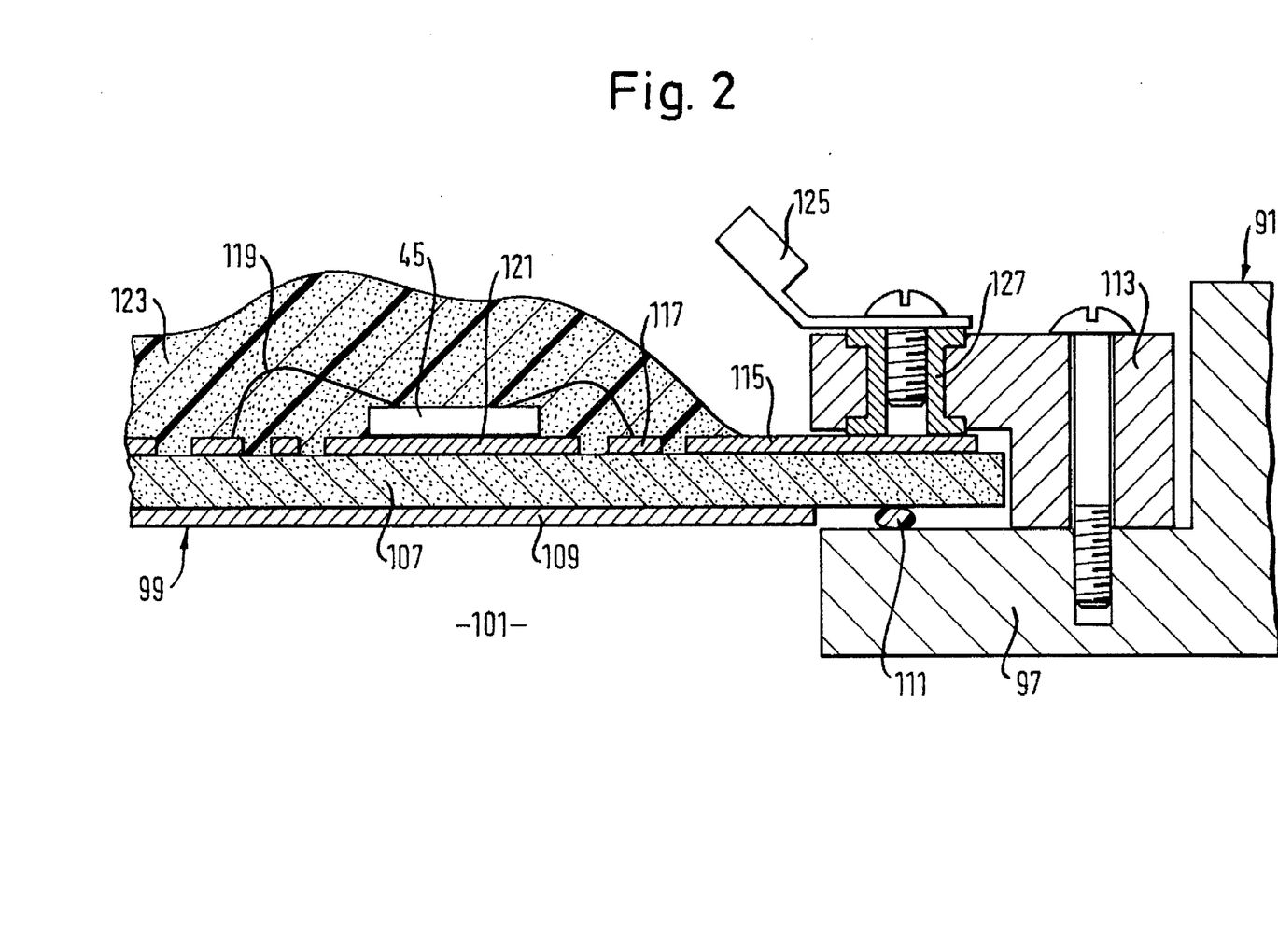
FIG. 2 is a detail of FIG. 1, on a larger scale, showing the mounting of a mounting board for the circuit breakers in a disc-shaped module.

FIG. 2 shows a detail of one possible manner in which the mounting board 99 can be mounted on the extension 97 of the pot housing 91, as well as one possible location of the electrical connections for the electronic components which are located on the mounting board. The mounting board 99 comprises an insulator board 107 made of an electrically isolating material, e.g. ceramic or painted steel, on the one flat side of which, namely on the flat side which is exposed to the flowing coolant in the cooling cheer 101, a metal coating 109 is applied over approximately the entire surface. On account of its high thermal conductivity, copper is preferred for use as the metal in the metal coating 109. A gasket 111 can be inserted between the mounting board 99 and the extension 97 and can seal the cooling chamber 101 with respect to the "electronics space" which is located on the opposite side of the mounting board. The mounting board 99 is preferably clamped firmly between the extension 97 and a mounting frame 113 which surrounds the mounting board 99 and is bolted to the extension 97, thereby compressing the sealing element 111. It is easy to see that a single disc-shaped module can also, if necessary, be equipped with several mounting boards which are mounted in this manner. The mounting board 99 need not necessarily be mounted parallel to the housing bottom 93; rather, in particular when the disc-shaped modules have a rectangular cross section, it is possible to use a stacked arrangement of several mounting boards which are oriented essentially parallel to the axis of rotation 15 of the electric motor 5.

On the insulator board 107, on the side facing away from the cooling chamber 101, there can be contact surfaces 115 and printed conductors 117 in the form of copper coatings. Preferably, also on this side are the semiconductor circuit breakers 45 and, if necessary, the electronic components of the control circuit and/or the driver circuit, which are connected to the printed conductors 117 by means of contact wires 119. If the circuit breakers 45 are realized in the form of IGBT modules, the metal electrode which forms a collector or drain can be realized as a metal coating 121 applied to the insulator board 107. The base or gate and source or emitter respectively are preferably applied in additional layers to this metal coating 121. As indicated above, the transistors which form the circuit breakers can also be other types, e.g. bipolar transistors or MOSFET transistors. The entire electronic side of the mounting board 99 is preferably coated with a potting compound 123, which is used to passivate and protect the electronic components. Such compounds will generally be well-known to those of ordinary skill in the art and will thus not be described in any further detail herein.

The connection of the electronic equipment to the winding connections of the electric motor, to the direct current intermediate circuit and to the control and sensor lines can be made via contact shoes 125 (of course, there are preferably a multiplicity of such contact shoes on each mounting board), which are in electrical contact with the contact surfaces 115 by means of the contact tubes which are inserted in the mounting frame 113. The contact shoes 125 can be bolted to the contact tubes 127, for example. Cables can be plugged onto the contact shoes 125 with corresponding matching shoes, and can lead to the electrical interface connections 85. The above-mentioned sensor lines can, for example, be used to carry sensor signals from a resolver 129 which detects the rotational position of the rotor 19 relative to the stator 21 (See FIG. 1), or from a temperature sensor 131 which measures the temperature of the field windings 23 (See FIG. 1).

It should also be noted that the line connections illustrated in FIG. 1 between the individual electrical interface connections 85 can, of course, comprise a bundle of lines, and are shown in the form of an individual line only to simplify the drawing.

Figure 3:
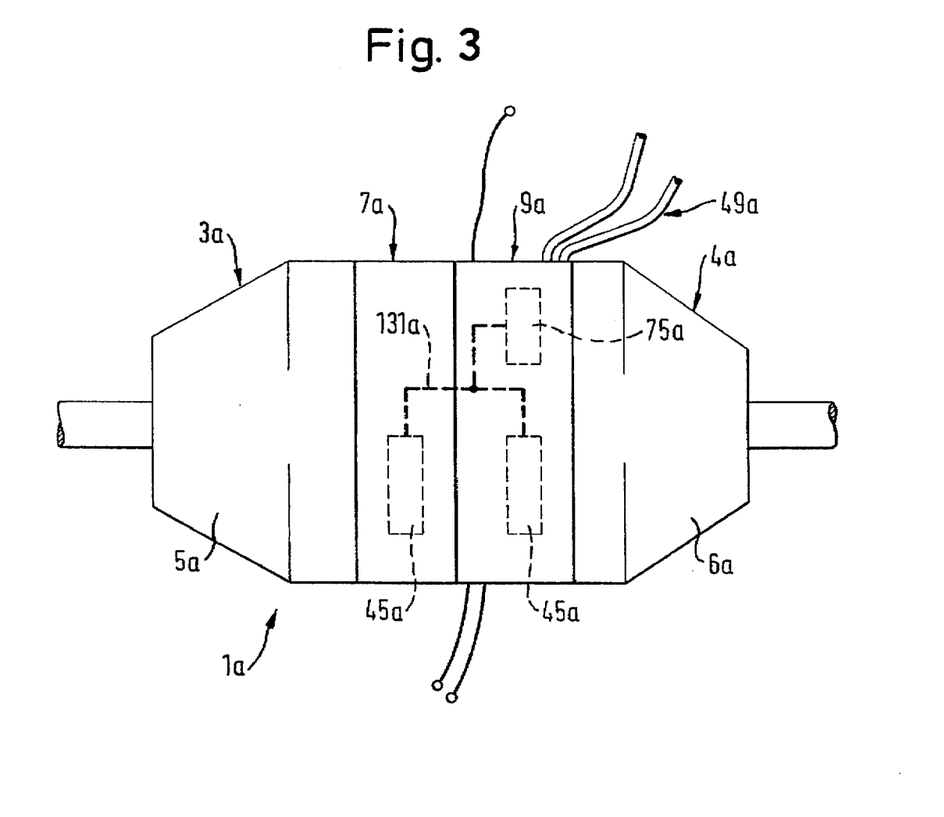
FIG. 3 is a schematic illustration of the principle of a tandem propulsion unit.

FIG. 3 is a schematic illustration of the principle of a tandem propulsion unit which contains two electric motors. Components which are analogous to the components in the embodiment illustrated in FIGS. 1 and 2 are identified by the same numbers, plus the index "a". Please refer to the preceding description for an explanation of such analogous components.

The tandem propulsion unit 1a illustrated in FIG. 3 comprises two electric motors 5a and 6a, each of which forms a first modular unit 3a and 4a respectively, and which are mechanically functional in themselves. Two second modular units 7a and 9a located axially between the two electric motors 5a, 6a supplement the two electric motors to form the propulsion unit 1a. The second modular unit 7a with its circuit breakers 45a thereby corresponds to the electric motor 5a on the left in FIG. 3, while the second modular unit 9a with its circuit breakers 45a corresponds to the electric motor 6a on the right in FIG. 3. All the circuit breakers 45a are controlled by a control circuit 75a which is completely contained in the modular unit 9a, namely so that the circuit breakers 45a of the two second modular units 7a, 9a are connected to a common control bus 131a, by means of which the control circuit 75a can transmit common control signals to the circuit breakers 45a. The control bus 131a can be realized so that it is also possible to actuate the circuit breakers 45a of either one of the two second modular units 7a, 9a separately. In the illustrated embodiment, it is sufficient, in view of the ability to route the coolant circuit and the electrical lines through all the modular units, to provide external connections for the coolant circuit, the direct current intermediate circuit and components of an external control system on one of the modular units, in the illustrated example the second modular unit 9a. If the modular unit 7a is also to be provided with such connections as a precautionary measure, it is possible to close these connections with plugs when they are not being used.

In the system illustrated in FIG. 3, the second modular units 7a, 9a, or also the first modular units 5a, 6a, can be replaced selectively with other modular units, e.g. units designed for a higher output. Likewise, in the embodiment illustrated in FIGS. 1 and 2, it is also possible to locate the control circuit 75a in a separate control module, and to provide a contact module which has all the external connections. The advantage of the invention, namely that in the event of a failure or malfunction, individual modular units can be replaced without having to replace the entire propulsion unit 1a, is thereby retained.

One feature of the invention resides broadly in the propulsion system for a vehicle, in particular a road vehicle, comprising: an electric motor 5, an electronic circuit breaker element 11 connected to field windings 23 of the electric motor 5, whereby the electronic circuit breakers 45 are mounted on the electric motor 5, a control circuit 75 which controls the circuit breakers 45, and a cooling device 47, the cooling circuit 49 of which cools the electric motor 5 and the circuit breakers 45 mounted on it, characterized by the fact that the electric motor 5 forms a first modular unit 3 which is mechanically functional in itself, and at least the circuit breakers 45 are combined in at least one second modular unit 7, 9 which can be separated from the first modular unit 3 but is connected firmly with the first modular unit 3 into a propulsion unit 1, and that the coolant circuit 49 of the cooling device 47 runs through the first 3 and each of the second modular units 7, 9, end the modular units 3, 7, 9 are connected to one another by means of detachable coolant interface connections 63 and detachable electrical interface connections 85.

Another feature of the invention resides broadly in the propulsion system characterized by the fact that the propulsion unit 1 comprises a third modular unit 3 which is detachably but firmly connected to it, which third modular unit is connected by means of detachable electrical interface connections 85 to the first modular unit 3 and/or at least one of the second modular units 7, 9 and/or at least one additional third modular unit.

Yet another feature of the invention resides broadly in the propulsion system characterized by the fact that the coolant circuit 49 also runs through at least one of the third modular units 13 and this third modular unit 13 is connected by means of detachable coolant interface connections 63 to the first modular unit 3 and/or at least one of the second modular units 7, 9 and/or at least one additional third modular unit.

Still another feature of the invention resides broadly in the propulsion system characterized by the fact that the coolant circuit 49 in the third modular unit 13 runs through channels which essentially form only a continuous connection between the coolant interface connections 63.

A further feature of the invention resides broadly in the propulsion system characterized by the fact that at least some of the electronic components of the control circuit 75 are contained in at least one of the second modular units 7, 9 and/or in at least one of the third modular units 13.

Another feature of the invention resides broadly in the propulsion system characterized by the fact that the propulsion unit 1a comprises an additional electric motor 6a which forms an additional first modular unit 4a which is detachably but firmly connected to the propulsion unit 1a and is mechanically functional in itself, and that the coolant circuit 49a also runs through the additional first modular unit 4a and is connected by means of detachable electrical interface connections and detachable coolant interface connections to the other 3a of the two first modular units 3a, 4a and/or at least one 9a of the second 7a, 9a and/or at least one of the third modular units.

Yet another feature of the invention resides broadly in the propulsion system characterized by the fact that corresponding each of the two first modular units 3a, 4a there is at least one second modular unit 7a, 9a and that the electronic circuit breakers 45a of these second modular units 7a, 9a are connected by means of a common control bus 131a which is connected to the control circuit 75a and which runs between these second modular units 7a, 9a, and via at least one of the third modular units, if any, via their electrical interface connections.

Still another feature of the invention resides broadly in the propulsion system characterized by the fact that at least some of the modular units 3, 7, 9, 13 in the propulsion unit 1 are stacked.

A further feature of the invention resides broadly in the propulsion system characterized by the fact that the modular units 3, 7, 9, 13, in essentially the axial direction of the electric motor 5, are adjacent on one side to an axial end wall 33 of the electric motor 5.

Another feature of the invention resides broadly in the propulsion system characterized by the fact that at least two pairs of modular units 3, 7; 9, 13 which are connected to one another have an identical interface pattern, at least with regard to the electrical interface connections 85 and the coolant interface connections 63.

Yet another feature of the invention resides broadly in the propulsion system characterized by the fact that when the propulsion unit 1 is realized with a multiplicity of second modular units 7, 9, at least some of the latter have the same number of electronic circuit breakers 45.

Still another feature of the invention resides broadly in the propulsion system characterized by the fact that at least some of the second 7, 9 and third 13 modular units, if any, are realized as essentially flat disc-shaped modules 7, 9, 13 which can be placed next to one another with their flat sides, and that the electrical interface connections 85 and/or the coolant interface connections 63 between adjacent disc-shaped modules 7, 9, 13 are made in their adjacent flat sides.

A further feature of the invention resides broadly in the propulsion system characterized by the fact that the coolant circuit 49 in the disc-shaped modules 7, 9, 13 is routed in channels which emerge in the flat sides of a housing shell 95 and in particular run essentially orthogonally to the plane of the disc.

Another feature of the invention resides broadly in the propulsion system characterized by the fact that the disc-shaped modules 7, 9, 13 are oriented in the axial direction of the electric motor 5 inside the circumferential contour of the electric motor 5, in particular in axial alignment with the latter.

Yet another feature of the invention resides broadly in the propulsion system characterized by the fact that in a disc-shaped module 7, 9 which forms the second modular unit 7, 9, at least one mounting board 99 is mounted for the circuit breakers 45 and the electronic components, if any, of at least part of the control circuit 75 and/or a driver circuit which drives the circuit breakers 45, in particular essentially orthogonally to the plane of the disc, and that the mounting board 99 forms one wall of a cooling passage 101 which forms part of the coolant circuit 49.

Still another feature of the invention resides broadly in the propulsion system characterized by the fact that the mounting board 99 comprises an electrically insulating insulator board 107, in particular one which is made of ceramic or painted steel, on one flat side of which, facing the coolant channel 101, a metal coating 109, in particular a copper coating, is applied to the surface, and on the other flat side of which are the circuit breakers 45 and the other electronic components, if any.

A further feature of the invention resides broadly in the propulsion system characterized by the fact that the disc-shaped modules 7, 9, 13 comprise an approximately pot-shaped housing 91 with a housing bottom 93 and a housing shell 95 which surrounds the housing bottom 93, and that the housing bottom 93 forms one wall of a coolant channel 101 which forms part of the coolant circuit 49.

Another feature of the invention resides broadly in the propulsion system characterized by the fact that the circuit breakers 45 are located upstream of the electric motor 5, in the direction of circulation of the coolant circuit 49 and are in heat exchange contact with the coolant.

Examples of coolant pumps, and other general components related to vehicular cooling systems, which may be utilized in accordance with the embodiments of the present invention, may be found in the following U.S. Pat. Nos.: No. 5,226,787, which issued to Freeman on Jul. 13, 1993; No. 5,317,994, which issued to Evans on Jun. 7, 1994; No. 5,337,704, which issued to Roth on Aug. 16, 1994; No. 5,353,751, which issued to Evans on Oct. 11, 1994.

Examples of heat exchangers, which may be utilized in accordance with the embodiments of the present invention, may be found in the following U.S. Pat. Nos.: No. 5,176,200, which issued to Shinmura on Jan. 5, 1993; No. 5,180,003, which issued to Kouzel et al. on Jan. 19, 1993; No. 5,180,005, which issued to Marsais et al. on Jan. 19, 1993; No. 5,180,006, which issued to Marsais et al. on Jan. 19, 1993; No. 5,183,107, which issued to Le Gauyer on Feb. 2, 1993; No. 5,184,672, which issued to Sanden on Feb. 9, 1993.

Examples of coolers, which may be utilized in accordance with the embodiments of the present invention, may be found in the following U.S. Pat. Nos.: No. 5,228,512, which issued to Bretl et al. on Jul. 20, 1993; No. 5,234,051, which issued to Weizenburger et al. on Aug. 10, 1993; No. 5,251,692, which issued to Haussmann on Oct. 12, 1993; No. 5,267,624, which issued to Christensen on Dec. 7, 1993; No. 5,307,865, which issued to Inagaki et al. on May 3, 1994.

Examples of IGBT components, which may be utilized in accordance with the embodiments of the present invention, may be found in the following U.S. Pat. Nos.: No. 5,182,626, which issued to Akiyama et al. on Jan. 26, 1993; No. 5,200,878, which issued to Sasagawa et al. on Apr. 6, 1993; No. 5,274,541, which issued to Kimura et al. on Dec. 28, 1993; No. 5,283,202, which issued to Pike, Jr. et al. on Feb. 1, 1994.

Examples of general bipolar transistors, which may be utilized in accordance with the embodiments of the present invention, may be found in the following U.S. Pat. Nos.: No. 5,177,582, which issued to Meister et al. on Jan. 5, 1993; No. 5,177,583, which issued to Endo et al. on Jan. 5, 1993; No. 5,178,370, which issued to Clark et al. on Jan. 12, 1993.

Examples of MOSFET components, which may be utilized in accordance with the embodiments of the present invention, may be found in the following U.S. Pat. Nos.: No. 5,177,207, which issued to Lowrey et al. on Jan. 5, 1993; No. 5,177,571, which issued to Satoh et al. on Jan. 5, 1993; No. 5,191,396, which issued to Lidow et al. on March 2, 1993; No. 5,200,632, which issued to Sakurai on Apr. 6, 1993.

Examples of BIMOS components, which may be utilized in accordance with the embodiments of the present invention, may be found in the following U.S. Pat. Nos.: No. 5,187,395, which issued to Pirez on Feb. 16, 1993; No. 5,198,691, which issued to Tarng on Mar. 30, 1993; No. 5,212,398, which issued to Matsunaga et al. on May 18, 1993; No. 5,256,582, which issued to Mosher et al. on Oct. 26, 1993.

Examples of resolver arrangements, which may be utilized in accordance with the embodiments of the present invention, may be found in the following U.S. Pat. Nos.: No. 5,189,353, which issued to Ezuka on Feb. 23, 1993; No. 5,200,682, which issued to Kim et al. on Apr. 6, 1993; No. 5,239,288, which issued to Tsals on Aug. 24, 1993; No. 5,304,909, which issued to Jin et al. on Apr. 19, 1994.

Examples of temperature sensors, which may be utilized in accordance with the embodiments of the present invention, may be found in the following U.S. Pat. Nos.: No. 5,235,850, which issued to Schurmann on Aug. 17, 1993; No. 5,343,613, which issued to Kintz et al. on Sep. 6, 1994; No. 5,230,222, which issued to ERbs on Jul. 27, 1993; 5,307,690, which issued to Hanazawa on May 3, 1994; No. 5,309,133, which issued to Berger et al. on May 3, 1994.

Some examples of hybrid engines and control systems therefor which may be utilized in accordance with the present invention are disclosed in the following U.S. Pat. Nos.: No. 4,305,254 to Kawakatsu et al. on Dec. 15, 1981, entitled "Control Apparatus and Method for Engine/Electric Hybrid Vehicle"; and No. 4,335,429 to Kawakatsu on Jun. 15, 1982, entitled "Control Apparatus for Engine/Electric Hybrid Vehicle".

Some examples of electric motors which can be operated as generators which may be utilized in accordance with the present invention are disclosed in the following U.S. Pat. Nos.: No. 5,327,992 to Boll on Jul. 12, 1994, entitled "Method for Controlling a Hybrid Drive Which Drives a Vehicle"; No. 5,249,637 to Heidl et al. on Oct. 5, 1993, entitled "Hybrid Vehicle"; and No. 5,323,743 to Kristiansson on Jun. 28, 1994, entitled "Sure-start Device for Internal Combustion Engine".

Some examples of generators which can be operated as motors which may be utilized in accordance with the present invention are disclosed in the following U.S. Pat. Nos.: No. 5,272,379 to Sugiyama et al. on Dec. 21, 1993, entitled "Power Supply Device for an Electric Vehicle"; No. 5,283,471 to Raad on Feb. 1, 1994, entitled "DC Generator and Back-up Engine Starting Apparatus"; and No. 5,281,905 to Dhyanchand et al. on Jan. 25, 1994, entitled "Induction Machine Based Hybrid Aircraft Engine Starting/Generating Power System".

Some examples of converters which may utilized in accordance with the present invention are disclosed in the following U.S. Pat. Nos.: No. 4,651,078 to Todoroki et al. on Mar. 17, 1987, entitled "Device for Driving an Induction Motor"; No. 4,673,858 to Saito on Jun. 16, 1987, entitled "Power Converter for AC Load"; No. 4,757,435 to Wood et al. on Jul. 12, 1988, entitled "Static-controlled Current-source AC/DC Power Converter and DC/AC Power Converter, and Protection System Embodying the Same"; No. 4,636,927 to Rhyne et al. on Jan. 13, 1987, entitled "DC to AC Converter"; No. 4,181,932 to Fujiwara on Jan. 1, 1980, entitled "Power Converter"; No. 4,366,532 to Rosa et al. on Dec. 28, 1982, entitled "AC/DC or DC/AC Converter System With Improved AC-line Harmonic Reduction"; No. 4,165,801 to Watanabe et al. on Aug. 28, 1979, entitled "Static Leonard System"; and No. 4,894,762 to Steinshorn on Jan. 16, 1990, entitled "Method and Apparatus to Avoid Commutation Failure in a Regenerative Converter".

Some examples of DC to AC converters which may be utilized in accordance with the present invention are be disclosed in the following U.S. Pat. Nos.: No. 4,173,040 to Borzov et al. on Oct. 30, 1979, entitled "DC to AC Voltage Converter"; No. 4,196,469 to Gurwicz on Apr. 1, 1980, entitled "DC-AC Converter Including Synchronized Switching"; No. 4,453,205 to Brakus on Jun. 5, 1984, entitled "DC/AC Converter With Shunt Regulated Load"; No. 4,443,750 to Altena on Apr. 17, 1984, entitled "Energy Saving Motor Speed Controller"; No. 4,446,052 to Thrap on Aug. 14, 1984, entitled "Programmable DC-To-AC Voltage Converter"; and No. 4,528,457 to Keefe et al. on Jul. 9, 1985, entitled "DC-AC Converter for Supplementing an AC Power Source".

Some examples of AC to DC converters which may be utilized in accordance with the present invention are disclosed in the following U.S. Pat. Nos.: No. 4,639,848 to Sakai on Jan. 27, 1987, entitled "Method and System for Controlling an AC-DC Converter System"; No. 4,656,571 to Umezu on Apr. 7, 1987, entitled "Frequency Converting Device and Control Method Therefor"; No. 4,739,466 to Glennon et al. on Apr. 19, 1988, entitled "Regulated AC/DC Converter"; No. 4,85,837 to Gulczynski on Aug. 1, 1989, entitled "Synchronous Switching Power Supply With Flyback Converter"; and No. 4,719,552 to Albach et al. on Jan. 12, 1988, entitled "AC-DC Converter Triggered by Variable Frequency Pulses".

Some examples of variable frequency converters which may be utilized in accordance with the present invention are disclosed in the following U.S. Pat. Nos.: No. 4,743,777 to Shilling et al. on May 10, 1988, entitled "Starter Generator System With Two Stator Exciter Windings"; and No. 5,093,751 to Yuki et al. on Mar. 3, 1992, entitled "Carry Noise Measuring System for Magnetic Recording Medium".

An example of a DC to DC converter which may be utilized in accordance with the present invention is disclosed in U.S. Pat. No. 4,513,361 to Rensink on Apr. 23, 1985, entitled "Multi-phase DC-to-AC and DC-to-DC Boost Converter".

Examples of voltage monitors and voltage regulators which may be utilized in accordance with the present invention may be disclosed in the following U.S. Pat. Nos.: No. 5,302,889 to Marsh on Apr. 12, 1994, entitled "Voltage Regulator"; No. 5,264,781 to Miller et al. on Nov. 23, 1993, entitled "Current Control/Power Limiter Circuit"; and No. 5,255,177 to Oku on Oct. 19, 1993, entitled "High-voltage Power Source Control Device".

Examples of hybrid drive arrangements, such as internal combustion engine-electric generator arrangements, and components associated therewith, such as control arrangements and individual motors for driving corresponding wheels, may be found in the following U.S. Pat. Nos.: No. 5,327,987, which issued to Abdelmalek on Jul. 12, 1994; No. 5,318,142, which issued to Bates et al. on Jun. 7, 1994; No. 5,301,764, which issued to Gardner on Apr. 12, 1994; No. 5,249,637, which issued to Heidl et al. on Oct. 5, 1993; No. 5,176,213, which issued to Kawai et al. on Jan. 5, 1993; No. 5,327,992, which issued to Boll on Jul. 12, 1994; No. 5,291,960, which issued to Brandenburg et al. on Mar. 8, 1994; and No. 5,264,764, which issued to Kuang on Nov. 23, 1993.

Examples of electric and hybrid vehicles, and related components, may be or are disclosed in the following U.S. Pat. Nos.: No. 5,251,721 entitled "Semi-hybrid Electric Automobile" to Ortenheim; No. 5,004,061 entitled "Electrically Powered Motor Vehicle" to Andruet; No. 5,289,100 entitled "System for Powering, Speed Control, Steering, and Braking" to Joseph; No. 5,265,486 entitled "Portable External Drive Assembly" to AAMCO Corporation; No. 5,289,890 entitled "Drive Unit for Electric Motor Vehicle" to Aisin; and No. 5,310,387 entitled "Differential Motor Drive" to Hughes Aircraft Company.

Additional examples of electric vehicles in which the present invention may be utilized may be or are disclosed in the following U.S. Pat. Nos.: No. 5,166,584 entitled "Electric Vehicle" to Nissan; No. 5,161,634 entitled "Electric Vehicle" to Kubota Corporation; and No. 5,150,045 entitled "Electric Automobile" to Kaisha.

Examples of electronic commutation devices, which may be utilized in accordance with the embodiments of the present invention, may be found in the following U.S. Pat. Nos.: No. 5,164,623 entitled "Independent-drive Wheel for a Wheel-mounted Vehicle"; No. 5,117,167 entitled "Commutating Energy Suppression Circuit for an Electronically Commutated DC Motor" to Rotron; No. 5,258,679 entitled "Structure of DC Motor with Electronic Commutation" to ECIA; and No. 5,117,167 entitled "Commutating Energy Suppression Circuit for an Electronically Commutated DC Motor" to Rotron.

Examples of phase angle sensors, which may be utilized in accordance with the embodiments of the present invention, may be found in the following U.S. Pat. Nos.: No. 5,203,290 entitled "Intake and/or Exhaust-valve Timing Control System for Internal Combustion Engine" to Atsugi Unisia; No. 5,277,063 entitled "Single Plane Trim Balancing" to General Electric; No. 5,353,636 entitled "Device for Determining Misfiring of Cylinders in Multi-cylinder Engines" to Toyota; No. 5,068,876 entitled "Phase Shift Angle Detector" to Sharp; No. 5,097,220 entitled "Circuit for Demodulating PSK Modulated Signal by Differential-Defection to Japan Radio"; end No. 5,063,332 entitled "Feedback Control System for a High-efficiency Class-D Power Amplifier Circuit".

Examples of three-phase motors for use with electric or hybrid vehicles, which may be utilized in accordance with the embodiments of the present invention, may be found in the following U.S. Pat. Nos.: No. 5,182,508, which issued to Schauder on Jan. 26, 1993; No. 5,194,800, which issued to Conzelmann et al. on Mar. 16, 1993; No. 5,216,212, which issued to Golowash et al. on Jun. 1, 1993; No. 5,230,402, which issued to Clark et al. on Jul. 27, 1993; and No. 5,294,853, which issued to Schluter et al. on Mar. 15, 1994.

Examples of sensors, such as speed and/or torque sensors, which may be utilized in accordance with the embodiments of the present invention, may be found in the following U.S. Pat. Nos.: No. 5,294,871, which issued to Imaseki on Mar. 15, 1994; No. 5,345,154, which issued to King on Sep. 6, 1994; No. 5,359,269, which issued to Wedeen on Oct. 25, 1994; No. 5,182,711, which issued to Takahashi et al. on Jan. 26, 1993; No. 5,245,966, which issued to Zhang et al. on Sep. 21, 1993; and No. 5,332,059, which issued to Shirakawa et al. on Mar. 15, 1994.

Examples of other media having components which may be utilized in accordance with the embodiments of the present invention, may be found in the following U.S. Pat. Nos.: No. 5,277,063, which issued to Thomas on Jan. 11, 1994; No. 5,373,630, which issued to Lucier et al. on Dec. 20, 1994; No. 5,373,632, which issued to Lucier et al. on Dec. 20, 1994.

Examples of battery-operated electric vehicles, having components, such as batteries for providing electrical power, which may be utilized in accordance with the embodiments of the present invention, may be found in the following U.S. Pat. Nos.: No. 5,229,703, which issued to Harris on Jul. 20, 1993; No. 5,325,912, which issued to Hotta et al. on Jul. 5, 1994; No. 5,332,630, which issued to Hsu on Jul. 26, 1994; No. 5,369,540, which issued to Konrad et al. on Nov. 29, 1994; No. 5,373,910, which issued to Nixon on Dec. 20, 1994.

Examples of converter arrangements, having components which may be utilized in accordance with the embodiments of the present invention, may be found in the following U.S. Pat. Nos.: No. 5,309,073, which issued to Kaneko et al. on May 3, 1994; No. 5,321,231, which issued to Schmalzriedt on Jun. 14, 1994; No. 5,341,083, which issued to Klontz et al. on Aug. 23, 1994; No. 5,350,994, which issued to Kinoshita et al. on Sep. 27, 1994; and No. 5,368,116, which issued to Iijima et al. on Nov. 29, 1994.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents and publications recited herein, are hereby incorporated by reference as if set forth in their entirety herein.

The corresponding foreign patent publication applications, namely, Federal Republic of Germany Patent Application No. P 44 42 867.7, filed on Dec. 2, 1994, having inventor Hans Fliege, and DE-OS P 44 42 867.7 and DE-PS P 44 42 867.7, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. Propulsion system for a hybrid vehicle, said propulsion system comprising:

an electric motor, an electronic circuit breaker element connected to field windings of the electric motor, the electronic circuit breaker element comprising circuit breakers being mounted on the electric motor, a control circuit to control the circuit breakers, a cooling device, the cooling device comprising a coolant circuit to cool the electric motor and the circuit breakers mounted on the electric motor, the electric motor forming a first modular unit, the first modular unit being mechanically functional, and at least the circuit breakers being combined in at least one second modular unit, the at least one second modular unit being separable from the first modular unit but being connected firmly with the first modular unit to form a propulsion unit; and the coolant circuit of the cooling device extends through the first modular unit and the at least one second modular unit, and the first modular unit and the at least one second modular unit being connected to one another by means of detachable coolant interface connections and detachable electrical interface connections.

2. Propulsion system for a vehicle, said propulsion system comprising:

an electric motor, an electronic circuit breaker element connected to field windings of the electric motor, the electronic circuit breaker element comprising circuit breakers being mounted on the electric motor, a control circuit to control the circuit breakers, a cooling device, the cooling device comprising a coolant circuit to cool the electric motor and the circuit breakers mounted on the electric motor, the electric motor forming a first modular unit, the first modular unit being mechanically functional, and at least the circuit breakers are combined in at least one second modular unit, the at least one second modular unit being separable from the first modular unit but is connected firmly with the first modular unit to form a propulsion unit; and the coolant circuit of the cooling device extends through the first modular unit and the at least one second modular unit, and the first modular unit and the at least one second modular unit being connected to one another by means of detachable coolant interface connections and detachable electrical interface connections.

3. Propulsion system as claimed in claim 2, wherein:

the propulsion unit comprises at least one third modular unit, the at least one third modular unit is detachably but firmly connected to the propulsion unit, the at least one third modular unit is connected by means of detachable electrical interface connections to at least one of: the first modular unit and the at least one second modular unit and at least one additional third modular unit.

4. Propulsion system as claimed in claim 3, wherein:

the coolant circuit extends through the at least one third modular unit and the at least one third modular unit is connected by means of detachable coolant interface connections to at least one of: the first modular unit and the at least one second modular unit and at least one additional third modular unit.

5. Propulsion system as claimed in claim 4, wherein:

the coolant circuit in the at least one third modular unit extends through channels which essentially form a continuous connection between the coolant interface connections.

6. Propulsion system as claimed in claim 5, wherein:

the control circuit comprises electronic components, at least some of the electronic components of the control circuit are contained in at least one of the at least one second modular unit and in the at least one third modular unit.

7. Propulsion system as claimed in claim 6, wherein:

the propulsion unit comprises an additional electric motor, the additional electric motor forms an additional first modular unit, the additional first modular unit is detachably but firmly connected to the propulsion unit and is mechanically functional, and the coolant circuit extends through the additional first modular unit and is connected by means of detachable electrical interface connections and detachable coolant interface connections to at least one of: the first modular unit and the at least one second modular unit and the at least one third modular unit.

8. Propulsion system as claimed in claim 7, wherein:

corresponding to each of the first modular unit and the additional first modular unit, there is at least one second modular unit and the circuit breakers of the second modular units are connected by means of a common control bus, the common control bus is connected to the control circuit and the common control bus extends between these second modular units, and via at least one third modular unit via their electrical interface connections.

9. Propulsion system as claimed in claim 8, wherein:

at least some of the modular units in the propulsion unit are stacked.

10. Propulsion system as claimed in claim 9, wherein:

the modular units, in essentially the axial direction of the electric motor, are adjacent on one side to an axial end wall of the electric motor.

11. Propulsion system as claimed in claim 10, wherein:

at least two pairs of modular units which are connected to one another have an identical interface pattern, at least with regard to the electrical interface connections and the coolant interface connections.

12. Propulsion system as claimed in claim 11, wherein:

when the propulsion unit is realized with a multiplicity of second modular units, at least some of the latter have the same number of electronic circuit breakers.

13. Propulsion system as claimed in claim 12, wherein:

at least some of the second modular units and the at least one third modular unit are realized as flat disc-shaped modules which can be placed next to one another with their flat sides disposed adjacent to one another; and at least one of the electrical interface connections and the coolant interface connections between adjacent disc-shaped modules are made in their adjacent flat sides.

14. Propulsion system as claimed in claim 13, wherein:

the coolant circuit in the disc-shaped modules is routed in channels which emerge in the flat sides of a housing shell and the channels extend essentially orthogonally to the plane of the disc-shaped module.

15. Propulsion system as claimed in claim 14, wherein:

the disc-shaped modules are oriented in the axial direction of the electric motor inside the circumferential contour of the electric motor and the disc-shaped modules are disposed in axial alignment with the electric motor.

16. Propulsion system as claimed in claim 15, wherein:

in a disc-shaped module which forms the second modular unit, at least one mounting board is mounted for the circuit breakers and the electronic components of at least part of at least one of the control circuit and a driver circuit to drive the circuit breakers, the at least one mounting board is disposed essentially orthogonally to the plane of the disc-shaped module; and the mounting board forms one wall of a coolant channel which forms part of the coolant circuit.

17. Propulsion system as claimed in claim 16, wherein:

the mounting board comprises an electrically insulating insulator board, the insulator board comprises one of ceramic and painted steel, on one side of the insulator board, facing the coolant channel, a metal coating is applied to the surface, the metal coating comprises a copper coating, and on an opposite side of the insulator board the circuit breakers and the other electronic components are disposed.

18. Propulsion system as claimed in claim 17, wherein:

the disc-shaped modules comprise an approximately pot-shaped housing with a housing bottom and a housing shell which surrounds the housing bottom; and the housing bottom forms one wall of a coolant channel which forms part of the coolant circuit.

19. Propulsion system as claimed in claim 18, wherein:

the circuit breakers are located upstream of the electric motor, in the direction of circulation of the coolant circuit and are in heat exchange contact with the coolant.

\* \* \* \* \*

UNITED STATES PATENT AND TRADEMARK OFFICE
CERTIFICATE OF CORRECTION

PATENT NO. : 5,678,646
DATED : October 21, 1997
INVENTOR(S) : Hans FLIEGE

It is certified that error appears in the above-identified patent and that said Letters Patent is hereby corrected as shown below:

In column 3, line 65, before 'of', delete "come" and insert --some--.

In column 10, line 58, after 'shell', delete "93." and insert --95.--.

In column 11, line 38, after 'cooling', delete "cheer" and insert --chamber--.

In column 13, line 30, after the first occurrence of '9', delete ", end" and insert --, and--.

In column 18, line 36, after 'Japan', delete "Radio"; end" and insert --Radio; and--.

Signed and Sealed this

Nineteenth Day of May, 1998

*Attest:*

BRUCE LEHMAN

*Attesting Officer*     *Commissioner of Patents and Trademarks*